UNITED STATES PATENT OFFICE.

PETER T. AUSTEN, OF BROOKLYN, AND HERBERT C. TUTTLE, OF NEW YORK, N. Y.

PROCESS OF MAKING ACETANILID, &c.

SPECIFICATION forming part of Letters Patent No. 578,384, dated March 9, 1897.

Application filed November 24, 1896. Serial No. 613,311. (No specimens.)

*To all whom it may concern:*

Be it known that we, PETER T. AUSTEN, a resident of Brooklyn, in the county of Kings, and HERBERT C. TUTTLE, a resident of New York, in the county of New York, State of New York, citizens of the United States, have invented a new and useful Improvement in the Manufacture of Acetanilid or the Acetoluids, of which the following is a specification.

Heretofore acetanilid and the acetoluids have been made by the action of glacial (anhydrous) acetic acid, acetic anhydrid, or acetyl chlorid on the respective amins. The practice has been to use the acid in the most concentrated and anhydrous form, because the reaction depends upon the elimination of water, as shown by the equation

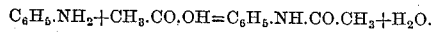

$$C_6H_5.NH_2 + CH_3.CO.OH = C_6H_5.NH.CO.CH_3 + H_2O.$$

It has therefore been supposed that the presence of water should be avoided, and all experience up to the present has supported this view. Even after boiling anilin with glacial acetic acid for ten hours in a flask connected with a reflux condenser a certain amount of the anilin is found to be still unconverted into acetanilid.

The cost of glacial acetic acid as compared with the weaker grades, such as thirty per cent., thirty-three per cent., and of the crude acetic acid known as "pyroligneous" acid, which are the ones usually met with in commerce, is high, and hence the cost of acetanilid is correspondingly great.

We have found that on heating anilin or the toluidins under pressure with acetic acid weaker than anhydrous acetic acid, for instance, with acid of fifty per cent. or of thirty-three per cent., or even with the crude pyroligneous acid, acetanilid or the acetoluids is formed. This discovery allows of the use of the cheaper grades of acetic acid in making acetanilid and the acetoluids and renders it possible to produce them at a lower cost than heretofore.

As an example of the process of making acetanilid by our method we will explain the production of acetanilid with acetic acid of fifty-per-cent. strength. Anilin-oil and fifty-per-cent. acetic acid are well mixed, whereby a clear solution results. A proportion which has given us good results is one part by weight of anilin and one and one-half to one and three-quarters parts by weight of acetic acid of fifty per cent. This quantity of acetic acid is about thirty per cent. more than the calculated amount for the acetylization of the anilin. The solution is then heated in an autoclave or suitable pressure apparatus at a temperature of 150° to 160° centigrade at a pressure of about fifty pounds for about thirty hours or until the anilin is satisfactorily converted into acetanilid. The resulting liquid is then run out into suitable receptacles, when on cooling it solidifies to a mass of acetanilid mixed with dilute acetic acid. The mixture may be distilled, the acetic acid and water going over first and then the acetanilid, or the free acetic acid may be neutralized by the addition of a solution of caustic soda and the liquid allowed to drain away from the acetanilid. The acetanilid is then purified by crystallization. The solution of sodium acetate, obtained as just described, is concentrated and allowed to crystallize. A small amount of acetanilid is separated from the concentrated solution before the crystallization of sodium acetate takes place. If acetic acid of other than fifty-per-cent. strength is used, a proportionate amount should be employed.

To make the acetoluids, the corresponding proportions of the raw materials should be used, as in the production of acetanilid.

Our process works more satisfactorily when the quantity of acetic acid, as compared with the quantity of anilin or the toluidins employed, is in excess of theoretical requirements. Therefore the quantity of acetic acid employed may be varied as the manufacturer may deem best to his advantage.

The preceding method is the best to us at present known; but as temperature and time and pressure are frequently convertible conditions in chemical reactions we do not limit ourselves to the exact time or temperature, nor the exact pressure, nor to the exact proportions, nor to the acetic acid of the exact strength above set forth, the essence of our invention being that when acetic acid so dilute that it cannot be used for the commercial manufacture of acetanilid or the acetoluids by boiling with the amin under a reflux condenser in the usual manner is heated with anilin or the toluidins under pressure the amin is converted into acetanilid or the acetoluids.

Having thus described our invention, what we claim as new, and desire to patent, is—

The within-described process of producing acetanilid or the acetoluids, which consists in mixing dilute acetic acid as hereinbefore described with the amin, and subjecting the mixture to heat and pressure above or in excess of that of the atmosphere until the conversion is satisfactorily completed, substantially as and for the purpose described.

In testimony that we claim the foregoing as our invention we have signed our names, in presence of two witnesses, this 23d day of November, 1896.

PETER T. AUSTEN.
HERBERT C. TUTTLE.

Witnesses:
F. J. MAYWALD,
HOWARD S. NEIMAN.

It is hereby certified that in Letters Patent No. 578,384, granted March 9, 1897, upon the application of Peter T. Austin, of Brooklyn, and Herbert C. Tuttle, of New York, N. Y., for an improvement in "Processes of Making Acetanilid, etc.," errors appear in the printed specification requiring correction, as follows: Page 1, line 29, the word "thirty" should read *fifty*, and same page, line 99, after the word "acid" and page 2, line 1, after the word "manner" commas should be inserted; and that the said Letters Patent should be read with these corrections therein that the same may conform to the record of the case in the Patent Office.

Signed, countersigned, and sealed this 20th day of April, A. D. 1897.

[SEAL.]
             JNO. M. REYNOLDS,
              *Assistant Secretary of the Interior.*

Countersigned:
 BENJ. BUTTERWORTH,
  *Commissioner of Patents.*